(12) United States Patent
 Talyansky et al.

(10) Patent No.: US 11,461,695 B2
(45) Date of Patent: Oct. 4, 2022

(54) SYSTEMS AND METHODS FOR FAULT TOLERANCE RECOVER DURING TRAINING OF A MODEL OF A CLASSIFIER USING A DISTRIBUTED SYSTEM

(71) Applicant: Huawei Technologies Co., Ltd., Shenzhen (CN)

(72) Inventors: Roman Talyansky, Munich (DE); Zach Melamed, Munich (DE); Natan Peterfreund, Munich (DE); Zuguang Wu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 863 days.

(21) Appl. No.: 16/363,639

(22) Filed: Mar. 25, 2019

(65) Prior Publication Data

US 2019/0220758 A1 Jul. 18, 2019

Related U.S. Application Data

(63) Continuation of application No. PCT/EP2017/050402, filed on Jan. 10, 2017.

(51) Int. Cl.
*G06K 9/00* (2022.01)
*G06N 20/00* (2019.01)
(Continued)

(52) U.S. Cl.
CPC .............. *G06N 20/00* (2019.01); *G06F 17/18* (2013.01); *G06K 9/6256* (2013.01);
(Continued)

(58) Field of Classification Search
CPC ........ G06N 20/00; G06N 7/005; G06N 20/20; G06N 5/003; G06N 3/08; G06N 5/04;
(Continued)

(56) References Cited

U.S. PATENT DOCUMENTS 8,768,870 B1 * 7/2014 Corrado ................... G06N 7/08
706/12
9,218,573 B1 12/2015 Corrado et al.
(Continued)

FOREIGN PATENT DOCUMENTS

CN 104714852 A 6/2015

OTHER PUBLICATIONS

Li et al, "Scaling Distributed Machine Learning with the Parameter Server," Proceedings of the 2014 International Conference on Big Data Science and Computing, XP055405900, pp. 1-16, Bigdatascience'14 (2014).
(Continued)

*Primary Examiner* — Alex Kok S Liew
(74) *Attorney, Agent, or Firm* — Leydig, Voit & Mayer, Ltd.

(57) ABSTRACT

A distributed system for training a classifier is provided. The system comprises machine learning (ML) workers and a parameter server (PS). The PS is configured for parallel processing to provide the model to each of the ML workers, receive model updates from each of the ML workers, and iteratively update the model using each model update. The PS contains gradient datasets associated with a respective ML worker, for storing a model-update-identification (delta-M-ID) indicative of the computed model update and the respective model update, a global dataset that stores, the delta-M-ID, an identification of the ML worker (ML-worker-ID) that computed the model update, and a model version that marks a new model in PS that is computed from merging the model update with a previous model in PS; and a model download dataset that stores the ML-worker-ID and the model version of each transmitted model.

20 Claims, 14 Drawing Sheets

(51) Int. Cl.
*G06N 20/20* (2019.01)
*G06F 17/18* (2006.01)
*G06K 9/62* (2022.01)
*G06N 5/04* (2006.01)
*G06F 11/14* (2006.01)

(52) U.S. Cl.
CPC ........... *G06K 9/6267* (2013.01); *G06N 5/043* (2013.01); *G06N 20/20* (2019.01); *G06F 11/1479* (2013.01)

(58) Field of Classification Search
CPC ...... G06N 99/00; G06N 20/10; G06N 3/0454; G06N 3/0445; G06N 3/126; G06N 5/02; G06N 5/022; G06N 3/0472; G06N 3/063; G06N 3/088; G06N 3/105; G06N 5/043; G06N 3/0481; G06N 3/049; G06N 3/082; G06N 3/086; G06N 7/00
See application file for complete search history.

(56) References Cited

U.S. PATENT DOCUMENTS

| | | | |
|---|---|---|---|
| 9,269,054 B1* | 2/2016 | Martin | G06N 5/02 |
| 2015/0324690 A1 | 11/2015 | Chilimbi et al. | |
| 2016/0103901 A1* | 4/2016 | Kadav | G06F 9/46 707/614 |
| 2019/0258983 A1* | 8/2019 | Thomaidou | G06Q 10/06398 |

OTHER PUBLICATIONS

Wang, "Database Meets Deep Learning," vol. 45, No. 2, pp. 17-22, XP058282472, SIGMOD Record (Sep. 28, 2016).
Duenner et al, "High Performance Distributed Machine Learning using Apache SPARK," arxiv.0 rg, 201 Olin Library Cornell University Ithaca, NY14853, XP080736895, pp. 1-12, Cornell University Library (Dec. 5, 2016).
Chilimbi et al, "Project Adam: Building an Efficient and Scalable Deep Learning Training System," Proceedings of the 11th USENIX Symposium on Operating Systems Design and Implementation, pp. 571-582, XP055243209, USENIX the Advanced Computing Systems Association (Oct. 6, 2014).
Wei et al, "Managed Communication and Consistency for Fast Data-Parallel Iterative Analytics," Kohala Coast, HI, USA, pp. 1-14, SoCC '15 (Aug. 27-29, 2015).

* cited by examiner

SYSTEMS AND METHODS FOR FAULT TOLERANCE RECOVER DURING TRAINING OF A MODEL OF A CLASSIFIER USING A DISTRIBUTED SYSTEM

CROSS-REFERENCE TO RELATED APPLICATIONS

This application is a continuation of International Application No. PCT/EP2017/050402, filed on Jan. 10, 2017, the disclosure of which is hereby incorporated by reference in its entirety.

BACKGROUND

The present disclosure, in some embodiments thereof, relates to systems and methods for training a model of a classifier using a distributed system and, more specifically, but not exclusively, to systems and methods for fault tolerance recovery during training of the model of the classifier using the distributed system.

In machine learning, a model of a classifier is trained using a training dataset. The model of the classifier is parameterized using a set of model parameters. A model of the classifier is selected, and the parameters may be tuned based on the training dataset. A model update is computed from the training dataset, and added to the model. The model is iteratively updated using computed model updates. Distributed computation systems are used to speed up the iterative training of large scale machine learning problems.

However, when there is a failure in one or more of the processors of the distributed computation system, recovery using available mechanisms is computationally complex, expensive in terms of processing and/or data storage resources, slow, and/or generally inefficient.

SUMMARY

It is an object of the present disclosure to provide an apparatus, a system, a computer program product, and a method for training a classifier using a distributed system.

The foregoing and other objects are achieved by the features of the independent claims. Further implementation forms are apparent from the dependent claims, the description and the figures.

According to a first aspect, a system for training a classifier comprises: machine learning (ML) workers each comprising at least one processor configured for computing a model update for a model of the classifier parameterized by a set of model parameters; a parameter server (PS) comprising at least one processor, the parameter server being configured to provide the model of the classifier to each of the ML workers, receive respective model updates based on the provided model of the classifier from each of the ML workers, and iteratively update the model of the classifier using each received model update; gradient datasets each associated with a respective ML worker, wherein each gradient dataset stores a model-update-identification (delta-M-ID) indicative of the respective model update computed by the respective ML worker, and stores the respective model update associated with each respective delta-M-ID; a global dataset that stores, the delta-M-ID associated with each model update used by the PS in each respective iteration to update the model of the classifier, an identification of the ML worker (ML-worker-ID) that computed the model update associated with the delta-M-ID of the respective iteration, and a model version (MODEL-VERSION) that marks a new model of the classifier in PS that is computed from merging the model update with a previous model of the classifier in PS; and a model download dataset that stores the ML-worker-ID and the MODEL-VERSION associated with each transmission of the model of the classifier from the PS to a certain ML worker.

Optionally, the PS may contain a plurality of processors for parallel processing.

According to a second aspect, a method for training a classifier by machine learning (ML) workers, comprises the steps of: providing, by a parameter server (PS), a model of the classifier to each of the ML workers; receiving, by the parameter server (PS), model updates from each of the ML workers; iteratively updating the model of the classifier based on each received model update; storing a model-update-identification (delta-M-ID) indicative of the respective model update computed by the respective ML worker; storing the respective model update associated with each respective delta-M-ID; and storing an identification of the ML worker (ML-worker-ID) that computed the model update associated with the delta-M-ID of the respective iteration, and a model version (MODEL-VERSION) that marks a new model of the classifier in PS that is computed from merging the model update with a previous model of the classifier in PS.

The fault tolerance mechanism of the system according to the first aspect and the method according to the second aspect significantly reduces the online overhead of fault tolerance provisioning, for example, in comparison to other fault tolerance methods. The fault tolerance mechanism described herein is implemented simply, with relatively low data storage and/or processor(s) utilization, for example, in comparison to other fault tolerance methods. The fault mechanism described herein provides short recovery time, for example, in comparison to other fault tolerance methods. The fault mechanism described herein recovers to a more recent version of the model, for example, in comparison to other fault tolerance methods.

The fault tolerance mechanism of the system according to the first aspect and the method according to the second aspect provides a faster recovery to a more recent model using fewer storage and/or processing resources. In contrast to the snap-shot based method and/or other methods (which stores the entire model in data storage device, which is slow), recovery based on the fault mechanism described herein (which is based on recovery using model updates) may be performed from the main memory of the devices of the PS (e.g., the nodes) and/or from the main memory of the devices of the ML workers, which is much faster.

In comparison to other systems and/or methods that require large and/or complex book-keeping (e.g., snap-shot, distributed hash table), the fault tolerance mechanism of the system according to the first aspect and the method according to the second aspect is implemented using relatively light in-memory book-keeping, providing very small runtime overhead.

In a first possible implementation of the system or the method according to the first or second aspects, when a first ML worker computes a first model update, the first model update and the first delta-M-ID associated with the first model update are stored in the first gradient dataset associated with the first ML worker; when the PS creates a second model of the classifier by merging the first model update with the first model of the classifier, the following are stored in the global dataset: the first delta-M-ID of the first model update, the ML-worker-ID of the first ML worker and the second MODEL-VERSION of the second model of the classifier; when a second ML worker receives the second model of the classifier from the PS, the second MODEL-VERSION of the second model of the classifier and the second ML-worker-ID of the second ML worker are stored in the model download dataset.

In a second possible implementation form of the system or the method according to the first or second aspects as such or according to any of the preceding implementation forms of the first or second aspects, the system further comprises a controller computing device associated with the PS, wherein the controller is configured to, or the method further includes the following acts performed by the controller: receive an indication of a failure in at least one of the processors of the PS, access the model download dataset to identify the second MODEL-VERSION and the associated second ML-worker-ID of the second ML-worker that downloaded the second model of the classifier, wherein the second MODEL-VERSION denotes the most recent entry in the model download dataset after the first MODEL-VERSION; access the second ML-worker using the second ML-worker-ID obtained from the model download dataset, and retrieve the second model of the classifier according to the second MODEL-VERSION obtained from the model download dataset; and initialize the PS using the second model of the classifier.

In a third possible implementation form of the system or the method according to the second implementation of the first or second aspects, the controller is configured to: access the global dataset to retrieve the third delta-M-ID and the third ML-worker-ID associated with the third MODEL-VERSION, wherein the third MODEL-VERSION denotes the most recent entry in the global dataset after the second MODEL-VERSION; access the third ML-worker according to the retrieved third ML-worker-ID to retrieve third model update according to the third delta-M-ID; instruct the PS to merge the third model update with the second model to recover the third model of the classifier corresponding to the third model of the classifier prior to the failure.

In a fourth possible implementation form of the system or the method according to the second or third implementations of the first or second aspects, the controller is configured to: receive an indication of a failure in at least one of the processors of the second ML-worker; access the model download dataset to identify the first MODEL-VERSION and the associated first ML-worker-ID of the first ML-worker that downloaded the first model of the classifier, wherein the first MODEL-VERSION denotes the entry in the model download dataset before the second MODEL-VERSION; access the first ML-worker using the first ML-worker-ID obtained from the model download dataset, and retrieve the first model of the classifier according to the first MODEL-VERSION obtained from the model download dataset; and initialize the PS using the first model of the classifier.

In a fifth possible implementation form of the system or the method according to the fourth implementation of the first or second aspects, the controller is configured to: access the global dataset to retrieve the second and third delta-M-IDs and the second and third ML-worker-IDs associated with the second and third MODEL-VERSIONs, wherein the second and third MODEL-VERSIONs denote the entries in the global dataset after the first MODEL-VERSION; access the second and third ML-worker according to the retrieved second and third ML-worker-IDs to retrieve the second and third model updates according to the second and third delta-M-IDs; instruct the PS to merge the second and third model updates with the first model of the classifier to recover the third model of the classifier corresponding to the third model of the classifier prior to the failure of at least one of the processors of the PS.

In a sixth possible implementation form of the system or the method according to the first or second aspects as such or according to any of the preceding implementation forms of the first or second aspects, the number of entries of MODEL-VERSION and associated ML-worker-ID in the model download dataset is selected according to a probability that all ML-workers with corresponding ML-worker-IDs stored in the model download dataset fail during the recovery process is less than a predefined requirement.

In a seventh possible implementation form of the system or the method according to the sixth implementation of the first or second aspects, the controller is associated with the model download dataset, and the controller is configured to: delete the oldest entry of MODEL-VERSION and associated ML-worker-ID stored in the model download dataset when a new entry of MODEL-VERSION and associated ML-worker-ID is added and stored in the model download dataset, to maintain a constant of the number of entries; delete the entries from the global dataset having a value of the MODEL-VERSION that represents earlier or equal values of the MODEL-VERSION of the oldest entry in the model download dataset that has been deleted; instruct removal of entries associated with gradient datasets having values of the delta-M-ID that appear in corresponding entries of the global dataset that are deleted.

In an eighth possible implementation form of the system or the method according to the first or second aspects as such or according to any of the preceding implementation forms of the first or second aspects, the number of entries storing delta-M-ID and associated model update in each gradient dataset associated with each ML-worker is at most two when the ML-workers have similar computational performance characteristics.

In a ninth possible implementation form of the system or the method according to the first or second aspects as such or according to any of the preceding implementation forms of the first aspect or second aspects, the number of entries N in the model download dataset is chosen such that the probability that all N ML workers, whose ML-worker-IDs are stored in the model download dataset, fail during the recovery process is negligible.

In a tenth possible implementation form of the system or the method according to the first or second aspects as such or according to any of the preceding implementation forms of the first or second aspects, the weights of a fully connected layer in each model update is implemented as a multiplication of two vectors.

In an eleventh possible implementation form of the system or the method according to the first or second aspects as such or according to any of the preceding implementation forms of the first or second aspects, the PS is implemented using a distributed system comprising computing devices each including at least one processing unit.

In a twelfth possible implementation form of the system or the method according to the first or second aspects as such or according to any of the preceding implementation forms of the first or second aspects, at least two of the ML workers are implemented using distinct computing devices.

In a thirteenth possible implementation form of the method according to the second aspect, a computer program stored on a computer readable medium runs the preceding method when executed by one or more processors of one or more computers.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
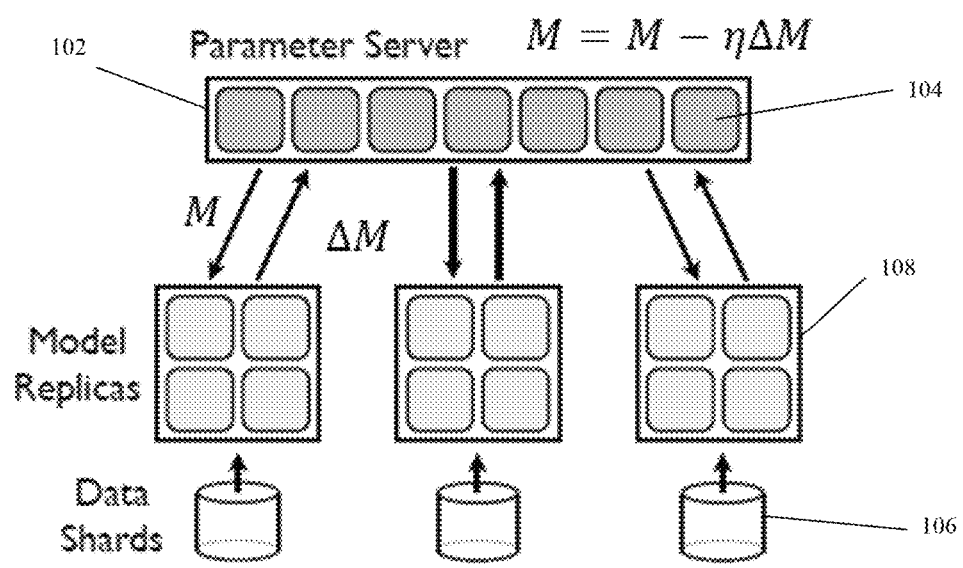
FIG. 1 is a schematic depicting operation of the PS, in accordance with some embodiments of the present disclosure.

The present disclosure, in some embodiments thereof, relates to systems and methods for training a model of a classifier using a distributed system and, more specifically, but not exclusively, to systems and methods for fault tolerance during training of the model of the classifier using the distributed system.

An aspect of some embodiments of the present disclosure relates to a system, and apparatus, and/or a method (e.g., code instructions executed by one or more processors) that provide fault tolerance capability to a model of a classifier parameterized by a set of model parameters, stored by a parameter server implemented as a distributed system. The fault tolerance mechanism efficiently recovers a recent version of the model during training of the model of the classifier when one or more processors of the PS fail. Multiple machine learning (ML) workers implemented as computing devices (e.g., single or distributed) compute model updates for the model, which are used by the PS to iteratively update the model of the classifier. The fault tolerance mechanism is performed, optionally by a controller computing device, based on data stored by a gradient dataset, a global dataset, and a model download dataset. The fault tolerance mechanism described herein significantly reduces the online overhead of fault tolerance provisioning, for example, in comparison to other fault tolerance methods. The fault tolerance mechanism described herein is implemented simply, with relatively low data storage and/or processor(s) utilization, for example, in comparison to other fault tolerance methods. The fault mechanism described herein provides short recovery time, for example, in comparison to other fault tolerance methods. The fault mechanism described herein recovers to a more recent version of the model, for example, in comparison to other fault tolerance methods.

Each certain ML worker is associated with a gradient dataset that stores a model-update-identification (delta-M-ID) in association with each computed model update. When a first ML worker computes a first model update, the first model update and the first delta-M-ID associated with the first model update are stored in the first gradient dataset associated with the first ML worker.

The global dataset stores the delta-M-ID associated with each model update used by the PS in each respective iteration to update the model of the classifier. The global dataset further stores an identification of the ML worker (ML-worker-ID) that computed the model update associated with the delta-M-ID of the respective iteration, and a model version (MODEL-VERSION) of a new model of the classifier. The MODEL-VERSION marks a new model of the classifier in PS that is computed from merging the model update with a previous model of the classifier in PS. When the PS creates a second model of the classifier by merging the first model update with the first model of the classifier, the following are stored in the global dataset: the first delta-M-ID of the first model update, the ML-worker-ID of the first ML worker and the second MODEL-VERSION of the second model of the classifier.

The model download dataset stores the ML-worker-ID and the MODEL-VERSION associated with each transmission of the model of the classifier from the PS to a certain ML worker. When a second ML worker receives the second model of the classifier from the PS, the second MODEL-VERSION of the second model of the classifier and the second ML-worker-ID of the second ML worker are stored in the model download dataset. A third model update is computed by a third ML-worker. The gradient table of the third ML-worker is updated to store the computed third model update and the associated delta-M-ID. The third ML-worker provides the third model update to the PS. A new entry is added to the global dataset with delta-M-ID of the third model update, the ID of the third ML-worker and third MODEL-VERSION.

The fault recovery is triggered (e.g., by a controller computing device associated with the PS) when an indication of a failure of one or more processors of the PS is received. The controller accesses the model download dataset to identify the second MODEL-VERSION and the associated second ML-worker-ID of the second ML-worker that downloaded the second model of the classifier. The second MODEL-VERSION denotes the most recent entry in the model download dataset after the first MODEL-VERSION. The controller accesses the second ML-worker using the second ML-worker-ID obtained from the model download dataset, and retrieves the second model of the classifier according to the second MODEL-VERSION obtained from the model download dataset. The PS is initialized using the second model of the classifier. The PS is instructed (e.g., by the controller) to merge the third model update with the second model to recover a third model of the classifier corresponding to the third model of the classifier prior to the failure. The controller obtains the third model update by accessing the global dataset to retrieve the third delta-M-ID and the third ML-worker-ID associated with the third MODEL-VERSION. The third MODEL-VERSION denotes the most recent entry in the global dataset after the second MODEL-VERSION. The controller accesses the third ML-worker according to the retrieved third ML-worker-ID to retrieve the third model update according to the third delta-M-ID. Then the controller merges the third model update with the model of the classifier in the PS to restore the third model of the classifier that was stored in the PS prior to the failure of one or more processors of the PS.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms model of the classifier, model, and model parameters may sometimes be interchanged. The model parameters are optionally implemented as a structured set of numbers, optionally as a vector of numbers.

As used herein, the terms distributed system and (processors arranged for, or system designed for) parallel processing are interchangeable when referring to the implementation of the PS.

A brief discussion of the meaning of the term model (of the classifier) is now provided. The model of the classifier is based on a domain of an application, for example, executing code instructions of the application may receive a digital image for analysis. The code instructions determine which objects appear in the image from a predetermined set of classes, for example, a bird, a human face, an aircraft. The code instructions of the application use the model of the classifier to receive the digital image and return the class of objects detected within the image. The model of the classifier may be implemented using one or more machine learning methods, for example, Support Vector Machines, Linear Regression, Artificial Neural Networks, statistical classifier, and the like. The code instructions extract a set of features (e.g., implemented as a feature vector and/or other suitable data structure) from the image and use the model of the classifier to map the feature vector to a class. The model of the classifier may be parameterized using a set of parameters. Optionally the parameter(s) is a number.

The model of the classifier is initially trained to perform the classification. The set of model parameters may be tuned to the target application. Training the model is done using a training set. For example, in image classification a training set includes a set of labeled images. In such a training set each image is paired with a class that correctly describes the image content. At the training stage the classifier analyzes the images and their correct labels from the training set to tune the model parameters. The trained model is used in the application to classify images that come from the same domain as the images in the training set.

When the model itself and the training set are huge, training the model on a single computing device takes weeks and even months. To speed-up the training process, the training process is mapped to multiple computing devices, e.g., to a cluster that may include from a few machines to thousands of machines. In such a mapping, the model and the training set may be distributed over many machines in the cluster. The computation may be performed in many cluster machines in parallel.

As used herein, the term parameter server (PS) means the set of computing devices that collectively store the model and update it using model updates.

Reference is now made to FIG. 1, which is a schematic depicting operation of the PS, in accordance with some embodiments of the present disclosure. The operation of the PS with reference to FIG. 1 is first described for clarity, without the components providing the fault tolerance mechanism described herein (i.e., without the controller, the gradient dataset, the global dataset, and the model download dataset).

A parameter server 102, implemented as multiple processors 104 arranged for parallel processing, stores and updates a model of a classifier (denoted as M). The training process is performed based on model updates (denoted as $\Delta M$) computed from data shards 106 by machine learning workers 108 (implemented as single computing devices or a distributed system).

The training process may be mathematically represented as $M'=M-\eta\Delta M$, where $\eta$ denotes a step size (e.g., a scalar) in which the model is advanced along the vector of the model update. The training process is performed iteratively. Each ML worker 108 computes a respective model update based on a received copy of M from PS 102. The computation of the model update may be mathematically represented as $\Delta M=\text{computeGrad}(M)$ where $\text{computeGrad}(M)$ denotes a gradient computation function. The model is updated in PS 102 according to the mathematical relationship $M'=M-\eta\Delta M$.

Figure 2A:
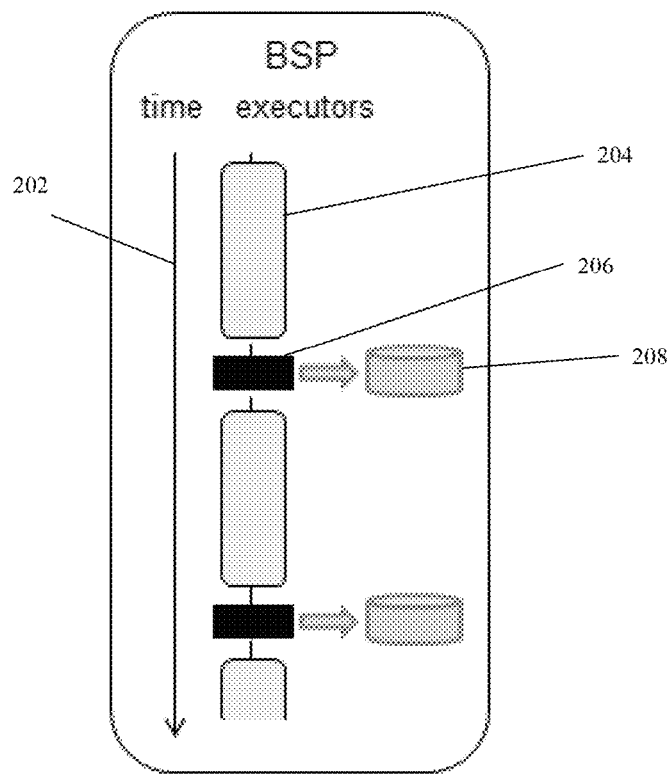
FIGS. 2A-2C are schematics depicting other fault tolerance mechanisms that are slower, more complex to implement, and/or require greater resources than the fault tolerance mechanism described herein, in accordance with some embodiments of the present disclosure.
Figure 2B:
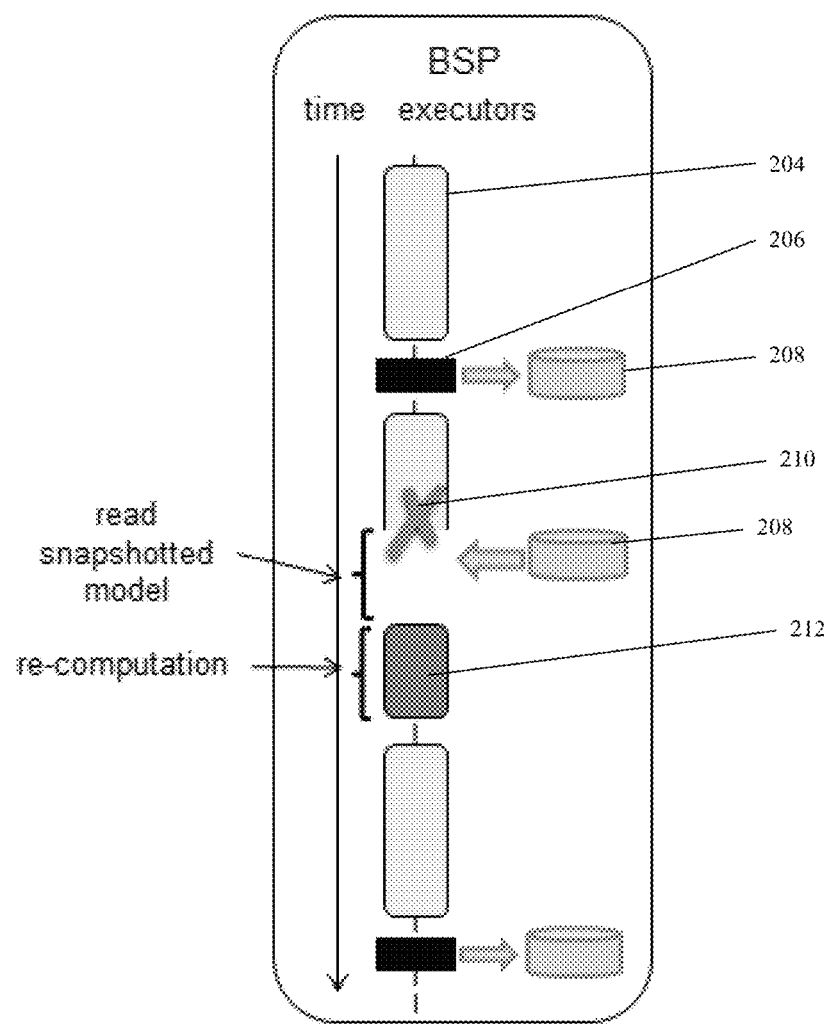
Figure 2C:
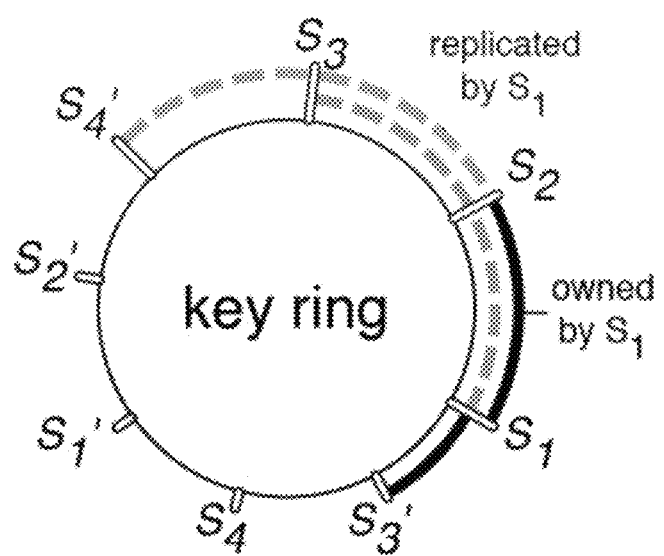

Reference is now made to FIGS. 2A-2C, which are schematics depicting other fault tolerance mechanisms that are slower, more complex to implement, and/or require greater resources than the fault tolerance mechanism described herein, in accordance with some embodiments of the present disclosure.

FIGS. 2A-B relates to a fault tolerance method referred to as a snapshot-based approach. FIG. 2A depicts fault free operation. Arrow 202 represents progress of time. Block 204 represents computation of a model update. Block 206 represents a snapshot of the model that is stored in a storage device 208. Blocks 204 and 206 are iterated. FIG. 2B depicts recovery during a fault represented as cross 210. On failure, the last model snapshot is read from storage device 208 and assigned to the PS. Model updates are recomputed (represented by block 212) to reach the model before failure. The snapshot-based approach stores a copy of the entire model during each snapshot. Storing the snapshot requires a relatively long period of time due to the size of the model, and requires significant storage and/or processing resources to perform the storage operation. Due to the time and/or resources required to perform the storage operation, the snapshot is rarely performed. As such, the actual stored copy of the model is outdated by a large number of updates that have been computed since the last snapshot. Upon failure, the model recovered from the storage device is relatively old, since multiple updates have been implemented since. The multiple updates need to be recomputed to reach the lost model version, which requires significant amount of time and processor resources. In comparison, the fault recovery mechanism described herein provides a faster recovery to a more recent model using fewer storage and/or processing resources. In contrast to the snapshot based method and/or other methods (which stores the entire model in data storage device, which is slow), recovery based on the fault recovery mechanism described herein (which is based on recovery using model updates) may be performed from the main memory of the devices of the PS (e.g., the nodes) and/or from the main memory of the devices of the ML workers, which is much faster.

FIG. 2C relates to a fault tolerance mechanism described as a replication-based approach that is based on a distributed hash table with a key set. The entire key set is partitioned into key ranges. Each partition is assigned to one of the PS computation devices. The assignment of the key ranges to the PS computation devices is arranged in a ring. A key-range, assigned to machine $S_i$ is replicated at a machine $S_{i-1}$. When a computation device of the PS fails, key-range replica of key-ranges at the failed computation device are replicated to other computation devices. The replication-based approach incurs a run-time overhead due to the management of the distributed hash table of the replication mechanism. The implementation complexity is high, requiring significant storage and/or processing resources to execute, which take a significantly long time. In comparison, the fault mechanism described herein provides a faster recovery to a more recent model using fewer storage and/or processing resources. In comparison to other methods that require large and/or complex book-keeping (e.g., snap-shot, distributed hash table), the fault mechanism described herein is implemented using relatively light in-memory book-keeping, providing very small run-time overhead.

Figure 3:
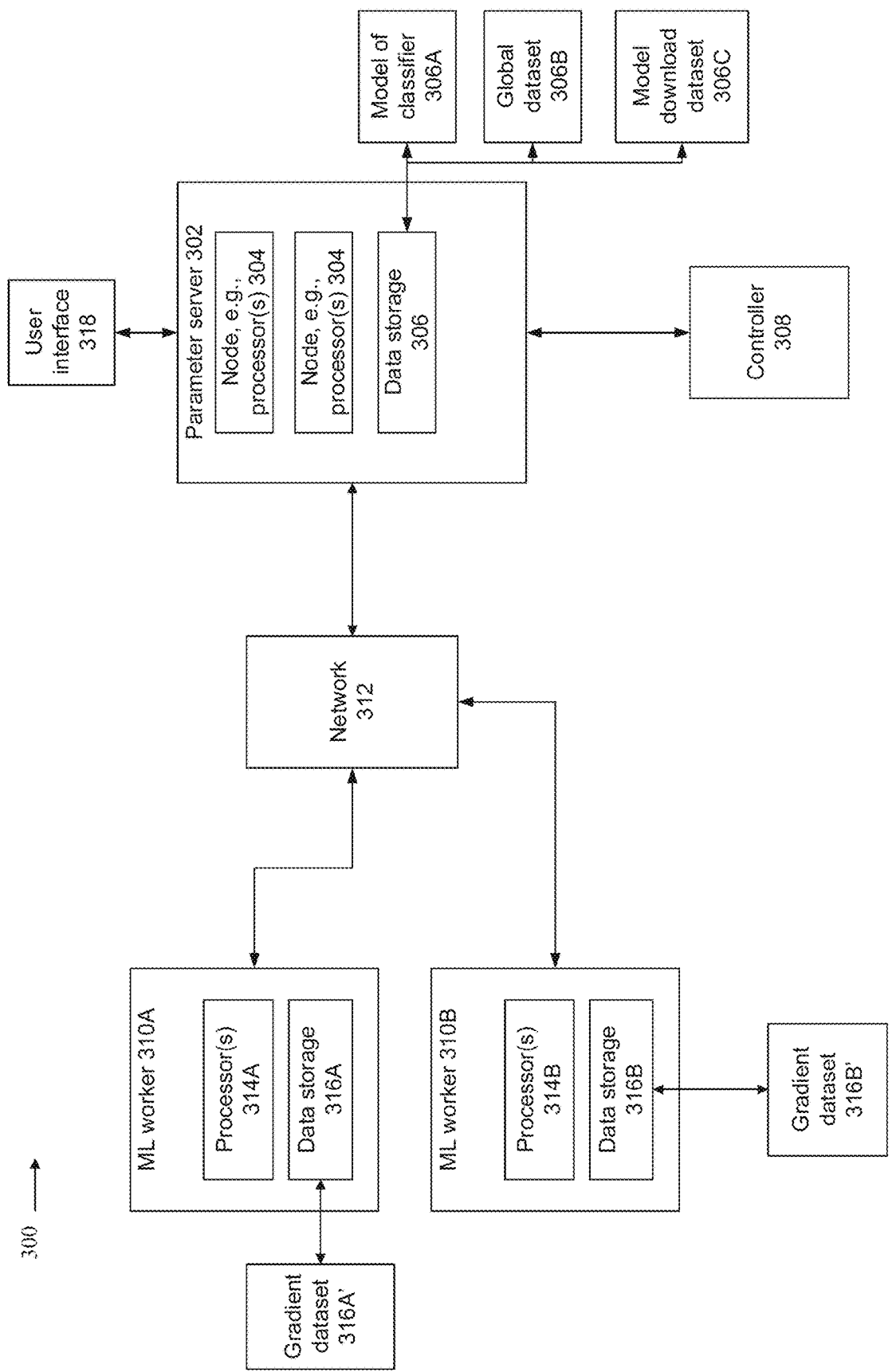
FIG. 3 is a block diagram of components of a system that provides fault tolerance to a parameter server during training of a model of a classifier, in accordance with some embodiments of the present disclosure.
Figure 4:
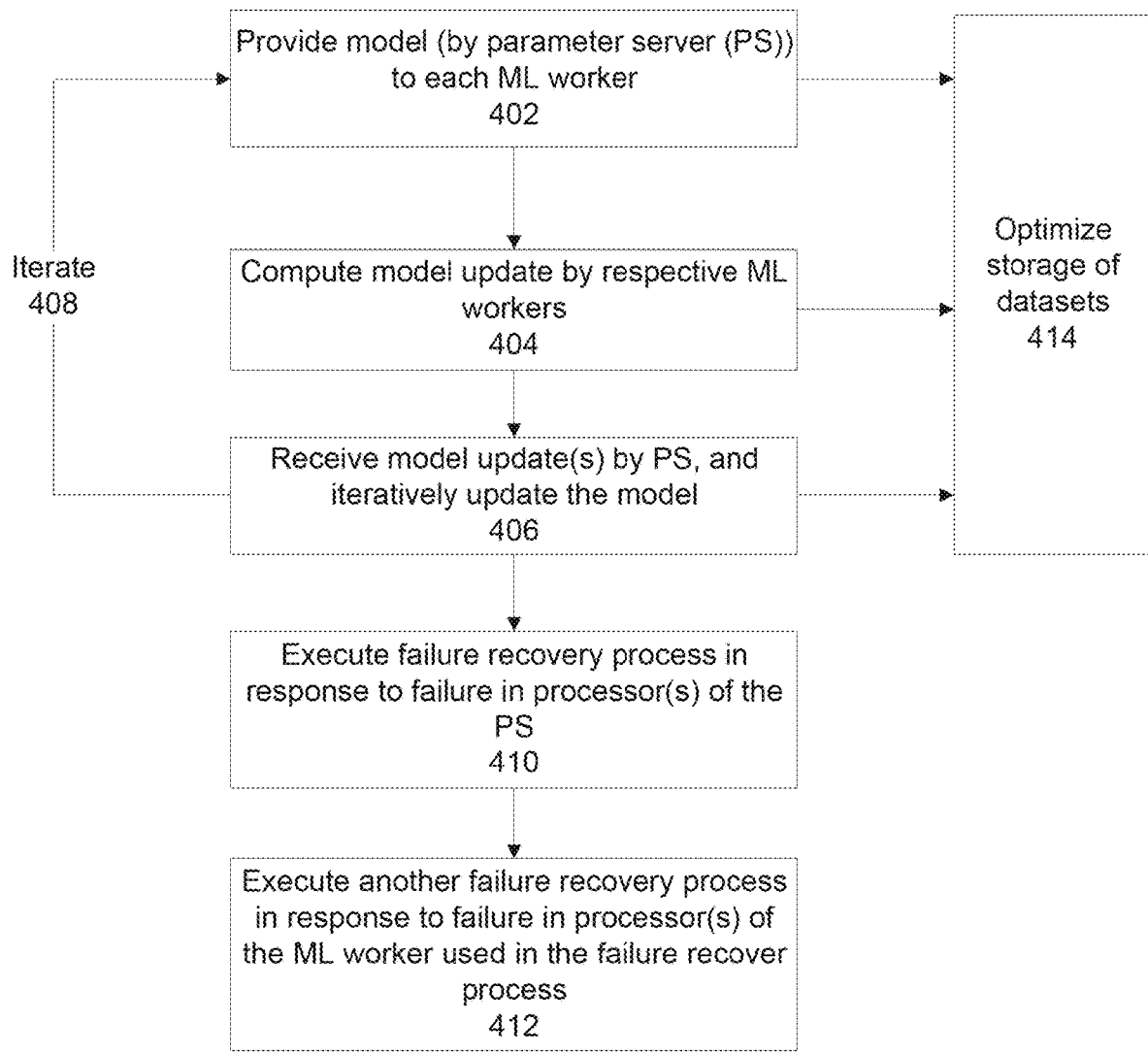
FIG. 4 is a flowchart of a method of implementing the fault tolerance mechanism to recover the model of the classifier created by the PS, in accordance with some embodiments of the present disclosure.

Reference is now made to FIG. 3, which is a block diagram of components of a system 300 that provides fault tolerance to a parameter server 302 during training of a model of a classifier, in accordance with some embodiments of the present disclosure. Reference is also made to FIG. 4, which is a flowchart of a method of implementing the fault tolerance mechanism to recover the model of the classifier created by the PS, in accordance with some embodiments of the present disclosure.

PS 302 is implemented as a distributed system designed for parallel execution of code instructions. PS 302 is implemented using multiple nodes 304. PS 302 may be implemented as a single unit (e.g., a box), or as multiple interconnected units (e.g., multiple boxes connected to each other). Each node 304 may be implemented as, for example, a processor, a group of processors arranged for parallel processing, a multi-core processor, a computing device (i.e., at least a processor and associated data storage device), and/or a group of computing devices arranged as a sub-distributed system. Nodes 304 may be homogenous or heterogeneous. Nodes 304 may be independent computational components, for example, a network server, a web server, a computing cloud, a local server, a remote server, a client terminal running code, a mobile device, a stationary device, a server, a smartphone, a laptop, a tablet computer, a wearable computing device, a glasses computing device, a watch computing device, and a desktop computer. Processors (of nodes 304) are implemented as, for example, a central processing unit(s) (CPU), a graphics processing unit(s) (GPU), field programmable gate array(s) (FPGA), digital signal processor(s) (DSP), and application specific integrated circuit(s) (ASIC).

PS 302 is associated with a data storage device 306 that stores (or stores a link to another storage device that stores) a model of the classifier 306A, a global dataset 306B, and a model download dataset 306C. The data (i.e., one or more of model of classifier 306A, global dataset 306B, and model download dataset 306C) may be stored in a main memory of PS 302 (e.g., in the main memory of one or more nodes 304 of PS 302). The main memory storage provides fast implementation of the fault tolerance mechanism.

Data storage device 306 may be implemented within PS 302, within one or more nodes 304 of PS 302, within a controller computing device 308, and/or within an external and/or remote storage device. Data storage device 306 may be implemented, for example, as a random access memory (RAM), and/or a storage device, for example, non-volatile memory, magnetic media, semiconductor memory devices, hard drive, removable storage, and optical media (e.g., DVD, CD-ROM).

Controller computing device 308 is associated with PS 302. Controller 308 may be implemented, for example, as software code instructions stored and executed by processor(s) of PS 302, as code instructions stored and executed by one or more nodes 304 of PS, as a hardware card installed within PS 302 and/or within one or more nodes 304, and/or as an independent computing device locally or remotely connected to PS 302 using a network or direct connection (e.g., cable, short range wireless link).

PS 302 is in communication with multiple ML workers 310 (for clarity two ML works 310A-B are shown) over a network 312. Examples of network 312 include the internet, a wireless network, a cellular network, a private network, a virtual private network, and a local area network.

Each ML worker 310A-B includes one or more processors 314A-B. It is noted that ML workers 310 may be implemented as a distributed sub-system that includes multiple processors, a multi-core processor, and/or network connected computing devices. For clarity, processor(s) 314 is depicted in FIG. 3, but it is understood that processor(s) 314 may represent the distributed sub-system, for example, processor(s) 314 may be implemented as described with reference to node 304. Optionally, at least two of the ML workers are implemented using distinct computing devices.

Each ML worker 310A-B is associated with a data storage device 316A-B. Storage device 316A-B may be implemented as described with reference to data storage device 306. Each data storage device 316A-B stores a respective gradient dataset 316A'-B'.

It is noted that the data stored by the gradient dataset(s), the global dataset, and the model download dataset may be directly stored within the dataset, or stored externally from the respective dataset with the respective dataset storing a link to the externally stored data.

One or more of PS 302, node 304, ML worker 310A-B, and controller 308 may be associated with one or more user interfaces 318 (one user interface 318 shown for clarity). Exemplary user interfaces 318 (which may be integrated with a display, or be implemented as a separate device) include one or more of: a touchscreen, a keyboard, a mouse, and voice activated software operating using speakers and microphone.

Referring now to back to FIG. 4, the acts of the method described with reference to FIG. 4 may be implemented as code instructions executed by one or more processors of the relevant computing device (or distributed sub-system) performing the respective act.

At 402, PS 302 provides the model of the classifier 306A to each of ML workers 310A-B over network 312. PS 302 may automatically transmit the updated version of the model, may transmit the updated version in response to a request from the ML worker, and/or may make the updated model available for download by the ML worker.

Model download dataset 306C stores the ML-worker-ID and the MODEL-VERSION associated with each transmission (e.g., download) of the model of the classifier from the PS to a certain ML worker. Model download dataset 306C is updated (e.g., by code instructions executed by one or more processors of PS 302 and/or controller 308) in response to the providing of the updated version of the model to the ML workers.

Model download dataset 306C may be implemented, for example, as a table, as a matrix, or other suitable data structures. An exemplary table implementation is shown below:

| ML-Worker-ID | MODEL-VERSION |
|---|---|
| 3 | 2 |
| 1 | 6 |
| 5 | 9 |
| ... | ... |

Each time a ML worker receives (e.g., downloading) the model from the PS, a row is appended to the table, by entering values for the ML-worker-ID of the ML worker that downloaded the model and the MODEL-VERSION of the downloaded model. The table is globally managed (e.g., by the PS).

At 404, one or more ML workers 310A-B compute a model update using the model received from PS 302.

The model update may be implemented using a compact representation. The compact representation may be stored using relatively reduced data storage space, and/or transmitted to the PS over the network more efficiently. A neural network model includes multiple layers of various types. The model update for a neural network model may be partitioned into layer updates—one layer update per each individual layer in the neural network. A fully connected layer is the layer type with the largest number of weights. The weights of the update of the fully connected layer (and/or other layers) may be implemented as a matrix. The matrix may be represented as a multiplication of two vectors. The two vectors represent the compact representation implementation. The model update may be represented on the order of one magnitude less numbers than the number of parameters of the model itself. Two model updates may be stored by each ML worker with negligible (i.e., very low) storage requirements.

The respective gradient dataset 316A'-B' stores a model-update-identification (delta-M-ID) indicative of the respective model update computed by the respective ML worker 310A-B. The model update associated with each respective delta-M-ID may be stored within the respective gradient dataset, or stored externally to the gradient dataset when the gradient dataset storing a link (e.g., pointer) to the externally stored model update.

Gradient dataset 316A'-B' may be implemented, for example, as a table, as a matrix, or other suitable data structures. An exemplary table implementation is shown below:

| ΔM ID | ΔM |
|---|---|
| 1 | $\Delta M_1$ |
| 2 | $\Delta M_2$ |
| 3 | $\Delta M_3$ |
| ... | ... |

ΔM ID denotes the delta-M-ID of the model update computed by the ML worker. The delta-M-ID is unique in the cluster. For example, the delta-M-ID may be created based on the model update index in the ML worker and the ML worker ID, or other methods to create unique delta-M-ID.

ΔM denotes storage of the model update.

Each ML worker may manage its own gradient dataset. When the ML worker creates the model update, the model update is stored in the table in association with the delta-M-ID.

When a certain ML worker computes a certain model update, the certain model update and the delta-M-ID associated with the certain model update are stored in the respective gradient dataset associated with the certain ML worker.

At 406, PS 302 receives the model updates computed by ML workers 310A-B, and iteratively updates the model of the classifier 306A using each received model update.

Global dataset 306B stores, for each update iteration:
the delta-M-ID associated with the model update used by the PS in each respective iteration to update the model of the classifier;
an identification of the ML worker (ML-worker-ID) that computed the model update of the respective iteration;
a MODEL-VERSION of the model of the classifier that resulted from merging the model update with the previous version of the model of the classifier in PS.

The MODEL-VERSION marks a new model of the classifier 306A in PS 302 that is computed from merging the model update with a previous model of the classifier in PS.

Global dataset 306B may be implemented, for example, as a table, as a matrix, or other suitable data structures. An exemplary table implementation is shown below:

| ΔM ID | ML-worker-ID | MODEL VERSION |
|---|---|---|
| ... | ... | ... |

When a model update gradient ΔM with associated ΔM ID from a certain ML worker having a certain ML-worker-ID is merged with the recent model stored by the PS, the table is updated by adding a new row in which MODEL VERSION is adjusted (e.g., incremented by one).

When PS 302 creates the updated model of the classifier by merging the received model update with the current model of the classifier, the following are stored in the global dataset: the delta-M-ID of the received model update, the ML-worker-ID of the ML worker that provided the model update, and the updated MODEL-VERSION of the updated model of the classifier.

At 408, blocks 402-406 are iterated to create the trained model of the classifier. When another ML worker receives the updated model of the classifier from the PS, the MODEL-VERSION of the updated model of the classifier and the ML-worker-ID of that another ML worker are stored in the model download dataset 306C.

At 410, an indication of a failure in at least one of the processors and/or nodes 304 of PS 302 is received, optionally by controller 308. The failure occurs during training of the model of the classifier, for example, during iterations of blocks 402-408.

Figure 5:
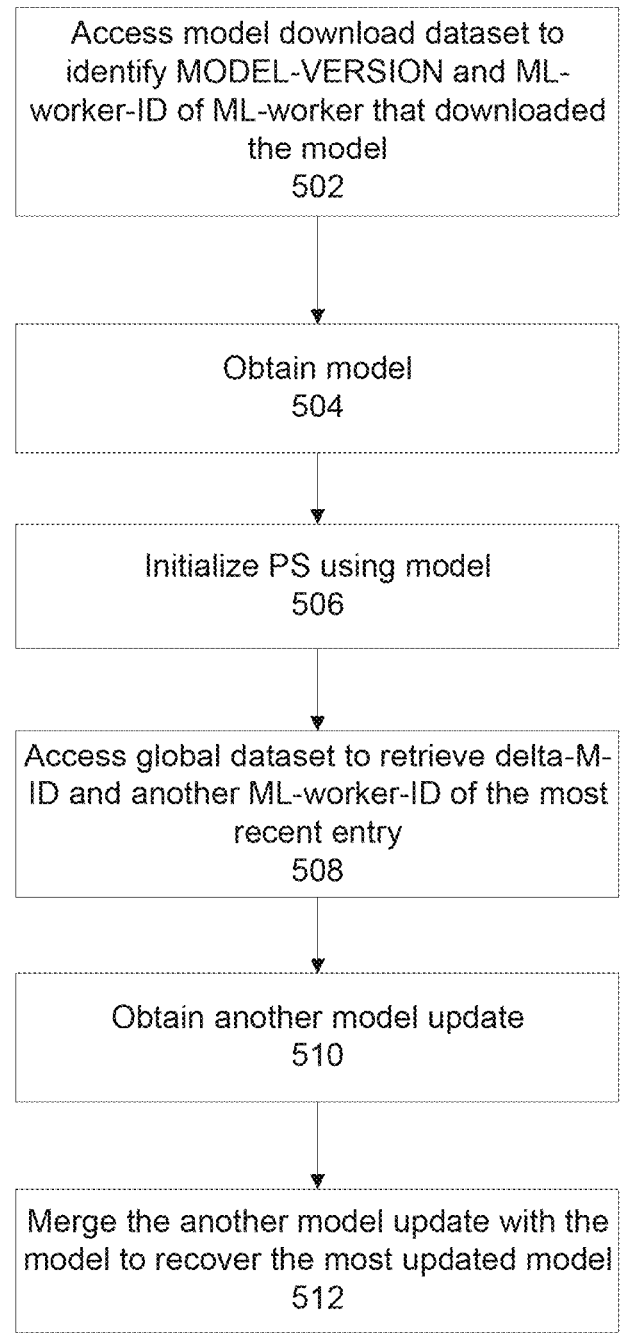
FIG. 5 is a flowchart of a method for recovery from the fault, in accordance with some embodiments of the present disclosure.

Reference is now made to FIG. 5, which is a flowchart of a method for recovery from the fault, in accordance with some embodiments of the present disclosure. The acts of the method described with reference to FIG. 5 may be implemented by one or more processors of controller 308 (and/or node 304 and/or PS 302) executing code instructions stored in a data storage device.

At 502, the model download dataset 306C is accessed to identify the recent MODEL-VERSION and the associated ML-worker-ID of the recent ML-worker (e.g., 310A) that downloaded the recent model of the classifier 306A. The recent MODEL-VERSION denotes the most recent entry in model download dataset 306C.

At 504, the recent ML-worker 310A is accessed using the recent ML-worker-ID obtained from the model download dataset 306C. The recent model of the classifier is retrieved according to the recent MODEL-VERSION.

At 506, PS 302 is initialized using the retrieved recent model of the classifier.

At 508, global dataset 306B is accessed to retrieve another delta-M-ID and another ML-worker-ID associated with another MODEL-VERSION, wherein that another MODEL-VERSION denotes the most recent entry in the global dataset after the most updated MODEL-VERSION.

At 510, that another ML-worker (e.g., 310B) is accessed according to the retrieved another ML-worker-ID to retrieve another model update according to the another delta-M-ID.

At 512, PS 302 is instructed to merge the another model update with the recent model to recover the another (i.e., most updated) model of the classifier corresponding to the another (i.e., most updated) model of the classifier prior to the failure.

Referring now back to FIG. 4, at 412, an indication of a failure in one or more processors and/or nodes of the recent ML-worker 310A (storing the model that is being used to re-initialize PS 302) is received by controller 308.

It is noted that the ML-worker-ID of recent ML-worker 310A is read from the last entry of the model download table (e.g., last row in a table implementation). The entry before the last entry in the model download table may be accessed and used for the fault tolerance process when the indication of failure is received. When the ML worker (accessed using the entry before the last entry) also fails, the earlier entry (before the entry before the last entry) may be accessed and used in the recovery process. As additional ML workers fail, earlier entries in the model download table may be accessed until all entries are exhausted. It is noted that the number of entries (e.g., rows) may be selected such that the probability that all ML workers referenced in the model download table fail during the recover process is negligible (e.g., below a defined negligible probability value).

Figure 6:
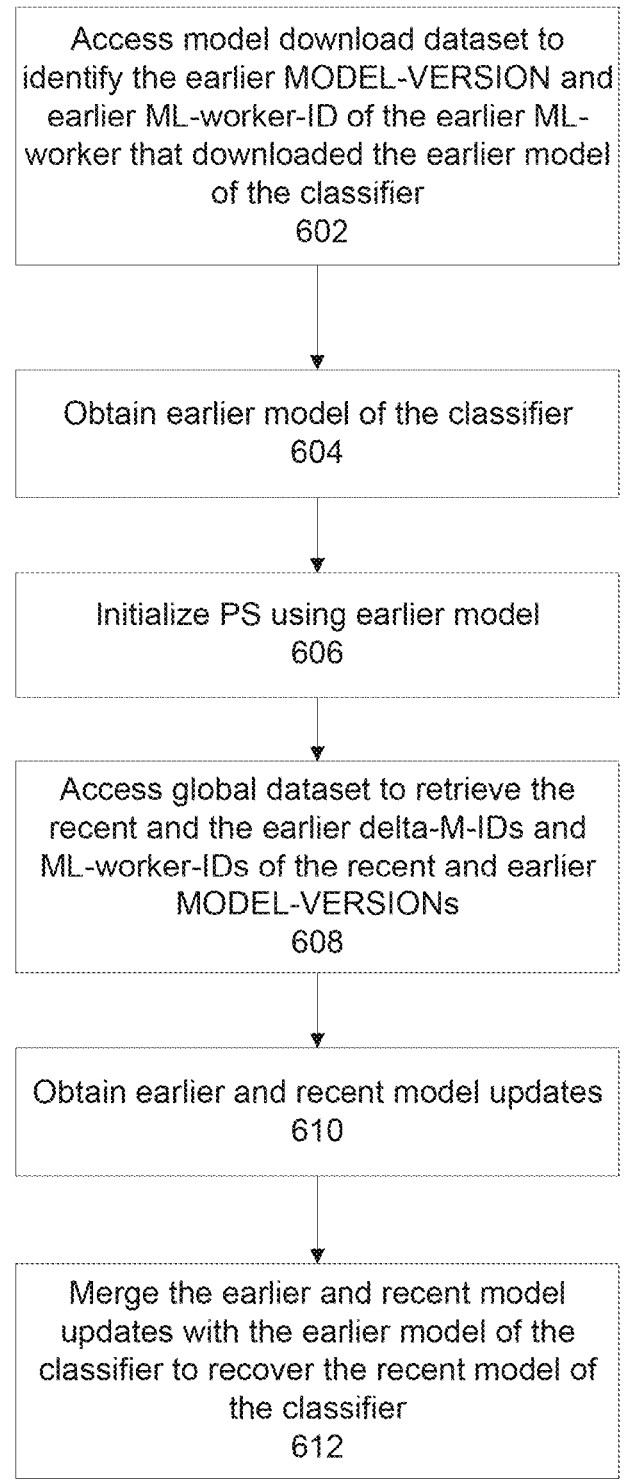
FIG. 6 is a flowchart of a method for recovery from the fault of the processors and/or nodes of the ML-worker, in accordance with some embodiments of the present disclosure.

Reference is now made to FIG. 6, which is a flowchart of a method for recovery from the fault of the processors and/or nodes of the recent ML-worker 310A, in accordance with some embodiments of the present disclosure. The acts of the method described with reference to FIG. 6 may be implemented by one or more processors of controller 308 (and/or node 304 and/or PS 302 and/or other processors and/or other nodes of ML-worker 310A) executing code instructions stored in a data storage device.

At 602, model download dataset 306C is accessed to identify the earlier MODEL-VERSION and the associated earlier ML-worker-ID of the earlier ML-worker (not shown in the figure) that downloaded the earlier model of the classifier. The earlier MODEL-VERSION denotes the entry in the model download dataset 306C before the recent MODEL-VERSION.

At 604, the earlier ML-worker 310A is accessed using the earlier ML-worker-ID. The earlier model of the classifier is retrieved according to the earlier MODEL-VERSION obtained from the model download dataset 306C. Alternatively, the earlier MODEL-VERSION may be computed and stored in another ML-worker, for example, ML-worker 310B.

At 606, PS 302 is initialized using the earlier model of the classifier.

At 608, global dataset 306B is accessed to retrieve the recent and the earlier delta-M-IDs and the recent ML-worker-IDs associated with the recent and earlier MODEL-VERSIONs. It is noted that since the earlier model has been computed, two model updates are computed, the recent model update and the earlier model update. The earlier MODEL-VERSION denotes the entry in the global dataset 306B prior to the recent MODEL-VERSION.

At 610, the earlier and recent ML-workers 310A and 310B are accessed according to the retrieved recent and earlier ML-worker-IDs to retrieve the recent and earlier model updates according to the recent and earlier delta-M-IDs.

At 612, PS 302 is instructed to merge the earlier and recent model updates with the earlier model of the classifier to recover the recent model of the classifier corresponding to the recent model of the classifier prior to the failure of the processor(s) and/or node(s) of the PS.

Referring now back to FIG. 4, at 414, optimizations of the model download dataset 306C, and/or global dataset 306B, and/or gradient dataset(s) 316A'-B' are performed. Optimizations may be performed as new entries are added to the respective datasets 306C, 306B, and 316A'-B', as described with reference to blocks 402-406. Optimizations may be based on defining the number of entries in the datasets, and/or deletion of old entries in the dataset. The deletion of old entries may be automatically instructed, for example, by controller 308.

Optionally, the number of entries of MODEL-VERSION and associated ML-worker-ID in the model download dataset 306C is selected according to a probability that all ML-workers 310A-B with corresponding ML-worker-IDs stored in the model download dataset 306C fail during the failure recovery process is less than a predefined requirement.

Alternatively or additionally, the number of entries storing delta-M-ID and associated model update in gradient datasets 316A'-B' is at most two when ML-workers 310A-B have similar computational performance characteristics (e.g., similar within a tolerance requirement defining statistically similar performance).

Alternatively or additionally, the number of entries N in the model download dataset 306C is chosen such that the probability that N or less ML workers fail during the recovery process is negligible, for example, below a define threshold. When at least one ML worker is active, the model may be recovered using the data in the model download dataset, as described herein.

Alternatively or additionally, the oldest entry of MODEL-VERSION and associated ML-worker-ID stored in the model download dataset 306C is deleted when a new entry of MODEL-VERSION and associated ML-worker-ID is added and stored in the model download dataset 306, to maintain a constant of the number of entries. The new entry (e.g., row in a table implementation) may replace the oldest existing entry, or the oldest entry is deleted, and a new entry is added, maintaining the constant number of entries.

Alternatively or additionally, deletion is performed of the entries of the global dataset 306B having a value of the MODEL-VERSION that represents earlier or equal values of the MODEL-VERSION of the oldest entry in the model download dataset 306C that has been deleted. During the recovery process, entries in global dataset 306B (e.g., rows in a table implementation) having MODEL-VERSION values at least as the smallest MODEL-VERSION value in model download dataset 306C are used (as described herein). When the oldest entry (e.g., row) is removed from download dataset 306C, rows from global dataset 306B that have MODEL-VERSION values at most as the value of MODEL-VERSION in the deleted entry (e.g., row) of model download dataset 306C are removed.

Alternatively or additionally, removal is performed of entries associated with gradient datasets having values of the delta-M-ID that appear in corresponding entries of the global dataset 306B that are deleted.

Reference is now made to FIGS. 7-10, which are schematics depicting dataflow based on system 300 described with reference to FIG. 3, and/or the method described with reference to FIG. 4, in accordance with some embodiments of the present disclosure.

Figure 7:
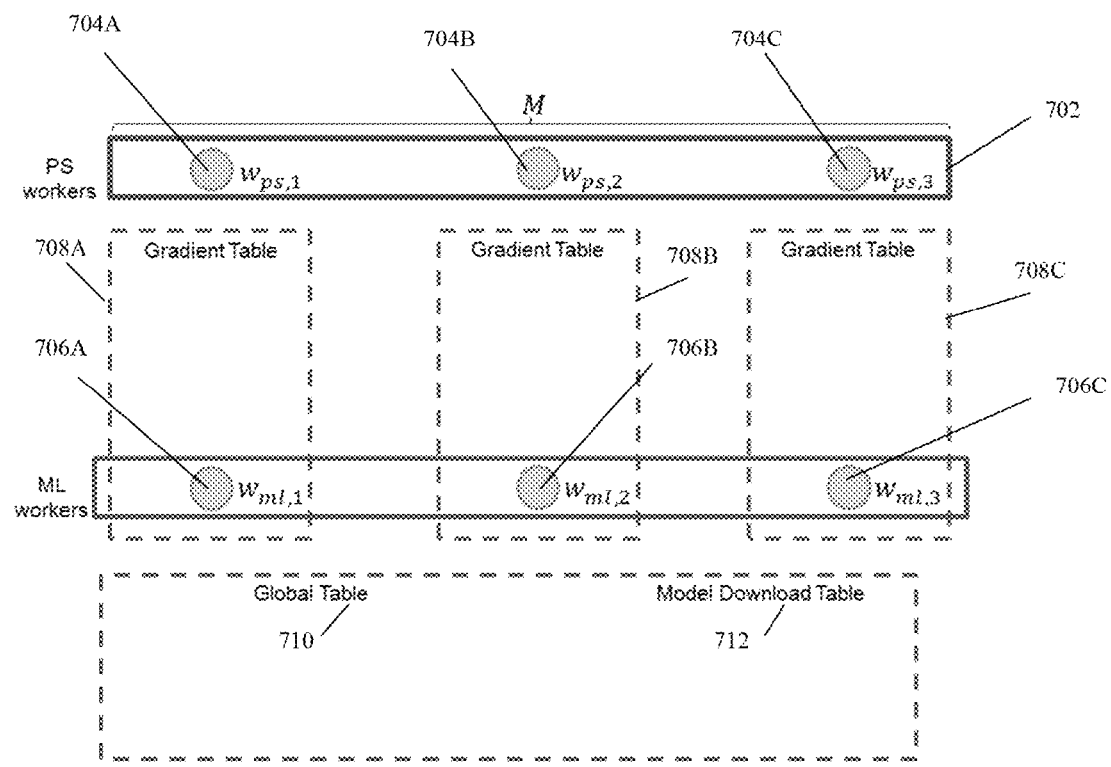
FIG. 7 is a schematic depicting components used to describe dataflow by FIGS. 8-10, in accordance with some embodiments of the present disclosure.
Figure 8:
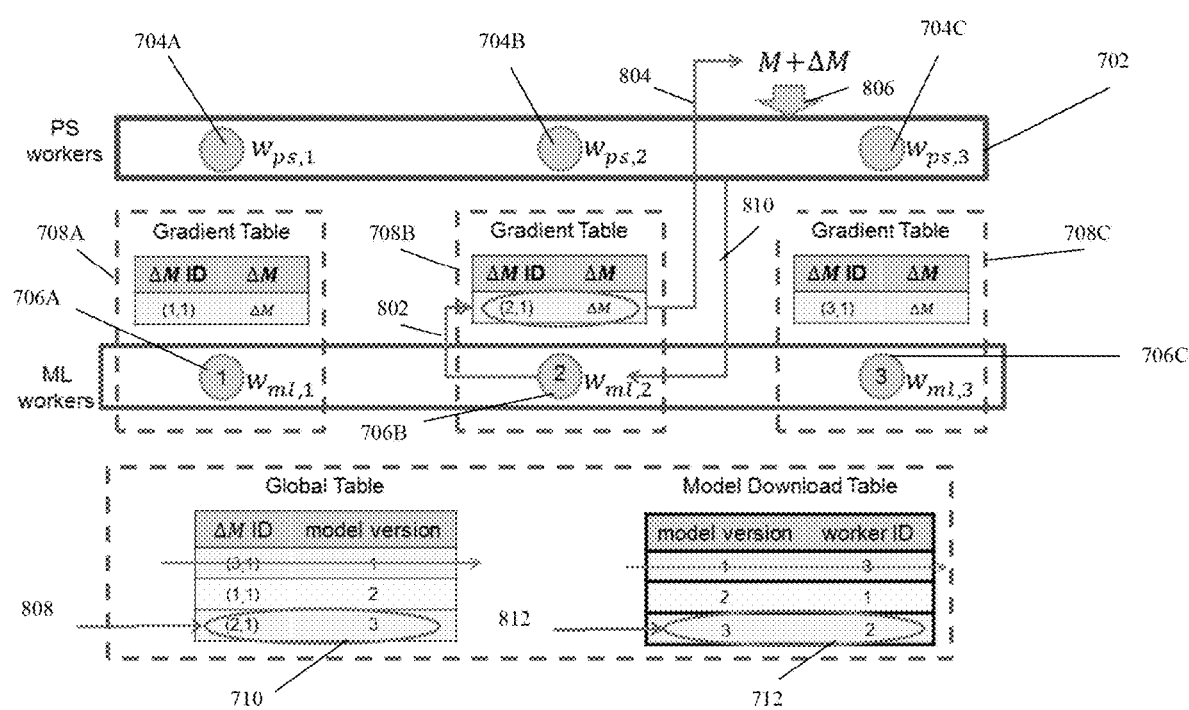
FIG. 8 is a schematic depicting dataflow when a ML worker computes a model update, in accordance with some embodiments of the present disclosure.
Figure 9:
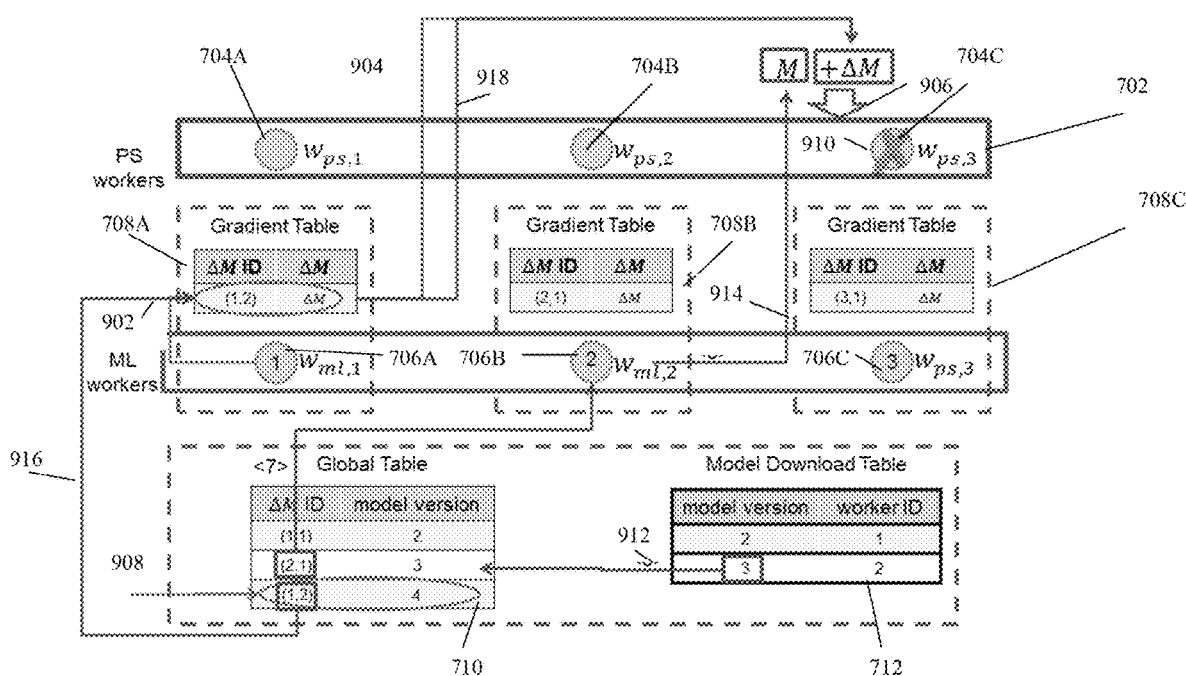
FIG. 9 is a schematic depicting dataflow depicting the recovery mechanism during failure of the ML worker (of FIG. 8) computing the model update, in accordance with some embodiments of the present disclosure.
Figure 10:
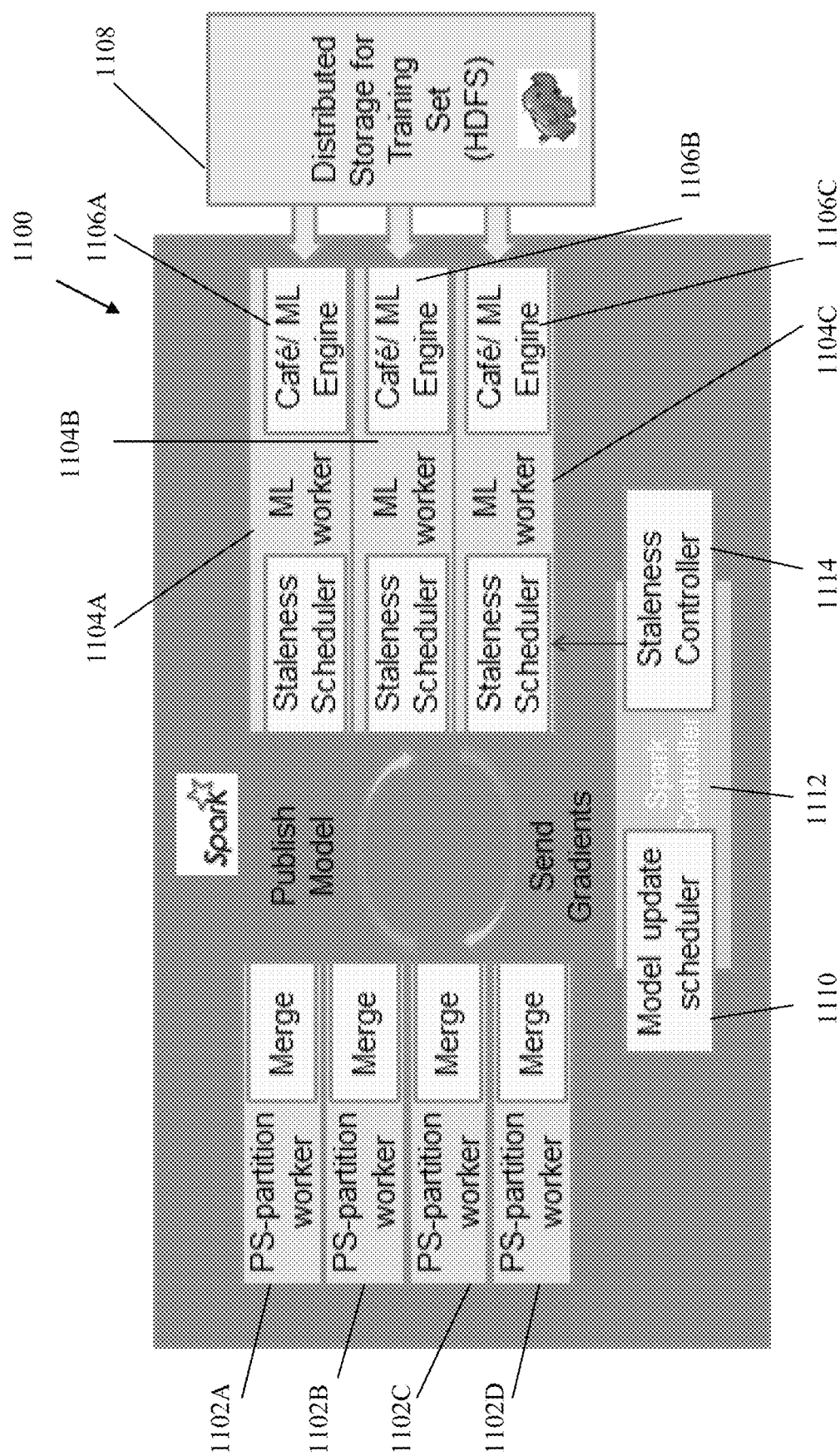
FIG. 10 is a schematic depicting an exemplary implementation of the system described with reference to FIG. 3 using Apache Spark™, in accordance with some embodiments of the present disclosure.

Reference is now made to FIG. 7, which is a schematic depicting components used to describe dataflow by FIGS. 8-10, in accordance with some embodiments of the present disclosure. PS 702 (corresponding to PS 302 of FIG. 3) includes multiple PS workers (represented as $w_{ps,1}$; $w_{ps,2}$; and $w_{ps,3}$, and represented by call out number 704A-C) store and/or compute the model of the classier (represented as M). Each ML worker (represented as $w_{ml,1}$; $w_{ml,2}$; and $w_{ml,3}$, and represented by call out number 706A-C) is associated with a respective gradient dataset (i.e., table) 708A-C. Globally managed data (e.g., managed by the PS and/or controller) include a global dataset (i.e., table) 710 and a model download dataset (i.e., table) 712.

Reference is now made to FIG. 8, which is a schematic depicting dataflow when ML worker 706B computes a model update ΔM, in accordance with some embodiments of the present disclosure. The dataflow is based on system 300 described with reference to FIG. 3, and/or the method described with reference to FIG. 4. Components of FIG. 8 are described with reference to FIG. 7.

At 802, gradient table 708B is updated. In a new row, key (2,1) is stored in column ΔM ID, and the newly computed model update ΔM is stored in column ΔM. Key (2,1) is created based on 2 denoting the ML-worker-ID of ML worker 706B, and 1 denoting the local model update ID within ML worker 706B.

At 804, model update ΔM is transmitted to PS 702.

At 806, model update ΔM is merged with the existing model of the classifier M, denoted as ΔM+M.

At 808, global table 710 is updated. A new row is created based on the newly created model. The key (2,1) is inserted into the ΔM ID column denoting the model update that has been used to create the recent model. The MODEL VERSION column is populated with the value 3 for the newly created model, by incrementing the value denoting the earlier MODEL VERSION (i.e., 2).

At 810, ML worker 706B downloads the new model.

At 812, model download table 712 is updated, by creating a new row that includes the value 3 for the MODEL VERSION (i.e., the model version of the downloaded new model) and ML-worker-ID 2 denoting the ID of ML worker 706B.

Reference is now made to FIG. 9, which is a schematic depicting dataflow depicting the recovery mechanism during failure of ML worker 704C, in accordance with some embodiments of the present disclosure. The dataflow is based on system 300 described with reference to FIG. 3, and/or the method described with reference to FIG. 4. Components of FIG. 9 are described with reference to FIG. 7.

At 902, ML worker 706A computes model update ΔM. Gradient table 708A is updated to include key (1,2) for the ΔM ID column and store the created model update ΔM in the model update (ΔM) column.

At 904, model update ΔM is transmitted to PS 702.

At 906, model update ΔM is merged with the existing model of the classifier M, denoted as ΔM+M.

At 908, global table 710 is updated. A new row is created based on the newly created model. The key (1,2) is inserted into the ΔM ID column denoting the model update ID of the model update. The MODEL VERSION column is populated with the value 4 for the newly created model, by incrementing the value denoting the earlier MODEL VERSION (i.e., 3).

At 910, PS worker (i.e., PS node) 704C fails, triggering the fault recovery mechanism.

At 912, the most recently downloaded version of the model is identified using model download table 712 as having MODEL VERSION 3. ML-worker-ID 2 denotes the last ML worker that downloaded the model with MODEL VERSION 3 (identified from the ML-worker-ID column of the same row).

At 914, model having MODEL VERSION 3 is read from ML worker 706B having ML-worker-ID 2, and used to initialize PS 702.

At 916, row(s) having a value of MODEL VERSION higher than 3 are identified in global table 710. The corresponding value of the ΔM ID column of the identified row(s) is read (i.e., (1,2)). Recall that the first component of those ΔM IDs points to the ML-worker (ML-worker 706A having ML-worker-ID 1) that stores these model updates, while the second component points to the local model update ID (i.e. 2) within ML-worker 706A. Thus, the ΔM ID values point to the ML-worker(s) (706A) that store the models updates that should be merged to the PS model to get models with the higher MODEL VERSION. The ΔM ID values include the local model update ID (i.e., 2) of the model update in the corresponding ML worker(s). ML worker(s) 706A is accessed.

At 918, the model update(s) corresponding to the value of the ΔM ID (i.e., (1,2)) is read from gradient table 708A of ML worker 706A and provided to PS 702. PS 302 restores the model to the state prior to the failure using the received model and model update.

When during the recovery process ML worker 706B (having ML-worker-ID that is found in the most recent row of model download table 712) also fails, the row that was created prior to the most recent row is identified. The recovery process is performed as described herein using the values of the identified earlier row.

The number of rows in model download table 712 may be selected such that the probability that all ML workers referenced in the rows of table 712 fail during the recovery process is below a negligible value.

Reference is now made to FIG. 10, which is a schematic depicting an exemplary implementation 1100 of system 300 described with reference to FIG. 3 using Apache Spark™, in accordance with some embodiments of the present disclosure.

A distributed collection stores the model of the classifier. The distributed collection may be viewed as an array that is distributed over a set of PS-partition worker machines 1102A-D. A distributed collection of ML workers 1104A-C serves to control ML engines, to facilitate downloading the model and to inject model updates from ML workers 1104A-C to a distributed collection of model updates. Once a set of model updates is injected to the distributed collection of model updates, these model updates are ready to be merged to the PS model. Each ML worker uses a machine learning (ML) engine 1106A-C, e.g., Cafe, to produce model updates. To produce the model updates, ML engines 1106A-C read training data from a distributed storage 1108. Model Update Scheduler 1110 implemented within an Apache Spark™ controller 1112 schedules periodic merge operation. Staleness controller 1114 helps to keep the local model replica in ML workers from diverging too far from each other.

Figure 11:
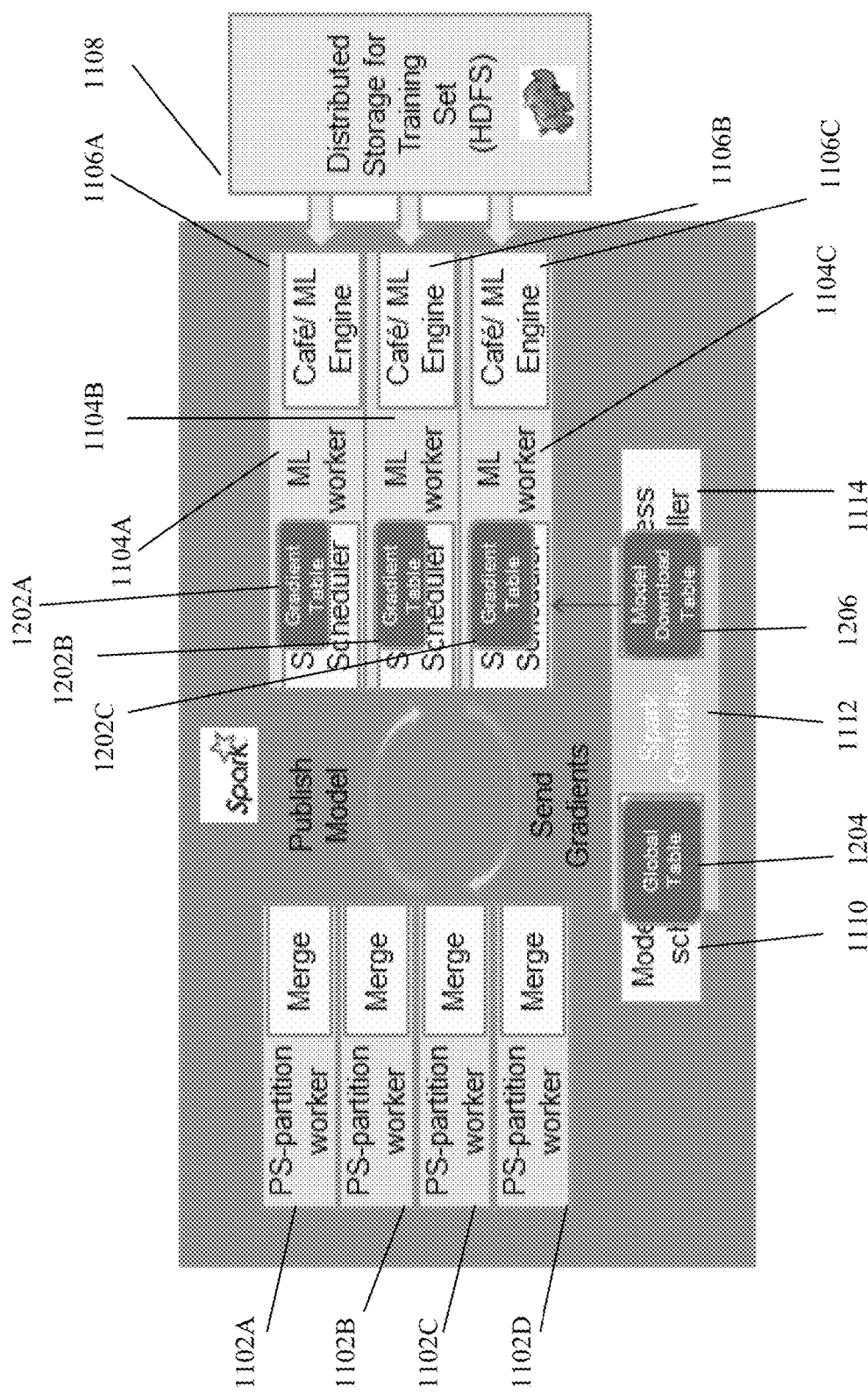
FIG. 11 is a schematic depicting the exemplary implementation described with reference to FIG. 10, including respective gradient datasets, a global dataset, and a model download table, in accordance with some embodiments of the present disclosure.

Reference is now made to FIG. 11, which is a schematic depicting the exemplary implementation 1100 described with reference to FIG. 10, including respective gradient datasets (e.g., tables) 1202A-C, a global dataset (e.g., table) 1204, and a model download table 1206, in accordance with some embodiments of the present disclosure. Gradient tables 1202A-C are stored and managed by respective ML workers 1104A-C. Global table 1204 and model download table 1206 are stored and managed by Apache Spark™ controller 1112.

Additional details of implementing system 300 described with reference to FIG. 3, and/or the method described with reference to FIG. 4 in the Apache SPARK™ environment are now discussed. ML workers are organized in a ML resilient distributed dataset (RDD). ML RDD controls the ML workers. Each data item in the ML RDD corresponds to a single ML engine. The gradient table of each ML worker is stored in the respective ML engine. Each ML worker manages a respective ML engine, e.g. Café. ML engines are distributed according to computation device availability in the cluster. Global and Model Download tables are stored and managed in Spark Master. PS is implemented as an RDD that stores the model as a distributed array. A mechanism that notifies Master on a PS machine failure is implemented.

On a PS machine failure, Spark Master accesses the Model Download table and finds the row (MODEL-VERSION, ML-worker-ID), where ML-worker-ID denotes the ID of the ML worker that was the last to download the model from the PS and MODEL-VERSION denotes the version of that model. Spark Master now initiates a procedure to reconstruct an RDD of the parameters (and place it correctly in the PS machines). A new RDD containing the model from ML-worker with id ML-worker-ID is created and partitioned, and then joined to a new empty RDD created and distributed to the PS-workers. This join shuffles the data, and effectively moves the partitions of the latest model from the ML-worker to the PS machines. Spark Master can then announce the existence of this new RDD to the other ML-workers, as normally occurs during the system operation.

Next Spark Master uses the value of the MODEL-VERSION to access the Global table and identify rows with model versions at least MODEL-VERSION. Then Spark extracts value(s) of ΔM ID of model updates from those rows. These model updates, when merged with the model in PS, reconstruct the latest model in the PS prior to the failure of the PS machines. Spark Master uses the model update id value(s) to create a gradient RDD, where each row (ΔM ID, ΔM) of the Gradient table is mapped to ΔM. Then Spark Master joins this RDD with the PS RDD to merge the required model updates to the model in PS RDD.

Figure 12:
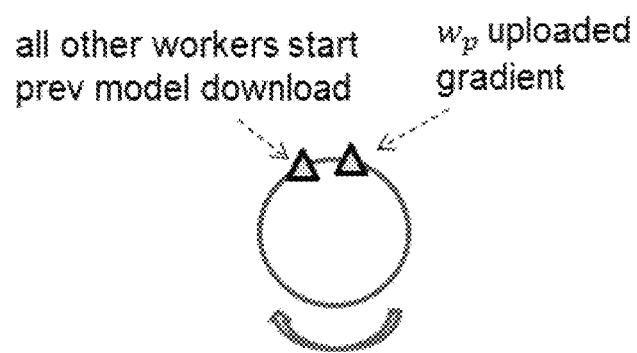
FIG. 12 is a schematic used to help explain an analysis to determine how many entries to implement in each gradient dataset, in accordance with some embodiments of the present disclosure.

Reference is now made to FIG. 12, which is a schematic used to help explain an analysis to determine how many entries (e.g., rows) to implement in each gradient dataset (e.g., table), in accordance with some embodiments of the present disclosure. The analysis is based on the assumption that all ML workers have similar performance characteristics (e.g., within a performance tolerance requirement, such as a range defining an acceptable statistical variation).

As discussed herein in detail, each ML worker downloads a copy of the recent model M from the PS, computes a model update ΔM, and uploads the model update to the PS, which merges the model update with the previous model M+=ΔM. A model update is removed from a gradient dataset after the model update is incorporated by the PS into the model, and after the current model or a later model is downloaded to at least two ML workers.

Next it is shown that the number of entries in the gradient dataset in each ML worker does necessarily not exceed 2 for an exemplary implementation. First a discussion is provided regarding the number of entries in the download dataset that is sufficient for any practical purpose. First, one hour is a very conservative upper bound on the recovery from a PS machine failure. Second, in modern systems the probability of one certain machine failure during one hour is very low. The probability that two certain machines fail within one hour is calculated as the probability of a single machine failure to the power 2, which should be small enough for any practical application. Thus having two entries in the download dataset is enough for any practical application. In the described analysis it is assumed that the number of entries in the download dataset is chosen such that it does not exceed the number of ML workers in the system, which is a very conservative assumption for any practical application. Now, it is recalled that each ML worker follows the following loop, as depicted in FIG. 4:

Receive the model from the PS.
Compute a model update. .1
Transfer the model update to the PS to merge with the PS model. .2
Go to Step 1. .3

Since all the ML workers have similar performance characteristics (assumption discussed above), by the time when the first ML worker transfers its second model update to the PS and starts downloading the PS model for the second time, all other ML workers have computed their own model updates, transferred them to the PS to merge with the PS model and transferred the updated PS model to themselves. This means that by the time the first ML worker starts its second download of the PS model, all other ML workers have downloaded a PS model and added an entry into the download dataset. Now, when the first ML worker downloads the PS model for the second time, the number of entries that all other workers added plus the entry in the download dataset that corresponds to its first download of the PS model is at least N. Thus, according to the described policy to delete entries from the download dataset and the assumption that the number of entries in the download dataset is chosen to be at most as the number of ML workers, when the first ML worker downloads a PS model for the second time, the entry that corresponds to its first download is deleted from the download dataset and, thus, from the gradient dataset. Thus, the number of entries in each gradient dataset does not exceed 2.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant parameter servers will be developed and the scope of the term parameter server is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A system for training a classifier, the system comprising:
    a plurality of machine learning (ML) workers each comprising at least one processor configured for computing a model update for a model of the classifier parameterized by a set of model parameters;
    a parameter server (PS) comprising at least one processor, the parameter server being configured to provide the model of the classifier to each of the ML workers, receive respective model updates from each of the plurality of ML workers, and iteratively update the model of the classifier using each received model update; and
    one or more storage devices storing:
        a plurality of gradient datasets each associated with a respective ML worker of the plurality of ML workers, wherein each gradient dataset stores a model-update-identification (delta-M-ID) indicative of the respective model update computed by the respective ML worker, and stores the respective model update associated with each respective delta-M-ID;
        a global dataset that stores, the delta-M-ID associated with each model update used by the PS in each respective iteration to update the model of the classifier, an identification of the ML worker (ML-worker-ID) that computed the model update associated with the delta-M-ID of the respective iteration, and a model version that marks a new model of the classifier in PS that is computed from merging the model update with a previous model of the classifier in PS; and
        a model download dataset that stores the ML-worker-ID and the model version associated with each transmission of the model of the classifier from the PS to a certain ML worker of the plurality of ML workers.

2. The system according to claim 1,
    wherein, in response to a first ML worker of the plurality of ML workers computing a first model update, the first model update and the first delta-M-ID associated with the first model update are stored in the first gradient dataset associated with the first ML worker;
    wherein, in response to the PS creating a second model of the classifier by merging the first model update with the first model of the classifier, the following are stored in the global dataset: the first delta-M-ID of the first model update, the ML-worker-ID of the first ML worker, and a second model version of the second model of the classifier;
    wherein in response to a second ML worker of the plurality of ML workers receiving the second model of the classifier from the PS, the second model version of the second model of the classifier and a second ML-worker-ID of the second ML worker are stored in the model download dataset.

3. The system according to claim 1, further comprising:
    a controller computing device associated with the PS, wherein the controller is configured to:
        receive an indication of a failure in a processor of the at least one processor of the PS;
        access the model download dataset to identify a second model version and an associated second ML-worker-ID of a second ML-worker that downloaded a second model of the classifier, wherein the second model version denotes the most recent entry in the model download dataset after the first model version;
        access the second ML-worker using the second ML-worker-ID obtained from the model download dataset, and retrieve the second model of the classifier according to the second model version obtained from the model download dataset; and
        initialize the PS using the second model of the classifier.

4. The system according to claim 3, wherein the controller is further configured to:
    access the global dataset to retrieve a third delta-M-ID and a third ML-worker-ID associated with a third model version, wherein the third model version denotes the most recent entry in the global dataset after the second model version;
    access a third ML-worker according to the third ML-worker-ID to retrieve a third model update according to the third delta-M-ID;

instruct the PS to merge the third model update with the second model to recover the third model of the classifier corresponding to the third model of the classifier prior to the failure.

5. The system according to claim 3, wherein the controller is further configured to:
receive an indication of a failure in a processor of the at least one processor of the second ML-worker;
access the model download dataset to identify the first model version and the associated first ML-worker-ID of the first ML-worker that downloaded the first model of the classifier, wherein the first model version denotes the entry in the model download dataset before the second model version;
access the first ML-worker using the first ML-worker-ID obtained from the model download dataset, and retrieve the first model of the classifier according to the first model version obtained from the model download dataset; and
initialize the PS using the first model of the classifier.

6. The system according to claim 5, wherein the controller is further configured to:
access the global dataset to retrieve the second delta-M-ID and a third delta-M-ID and the second ML-worker-ID and a third ML-worker-ID associated with the second model version and a third model version, respectively, wherein the second and third model versions denote the entries in the global dataset after the first model version;
access the second and third ML-worker according to the second and third ML-worker-IDs to retrieve the second and third model updates according to the second and third delta-M-IDs;
instruct the PS to merge the second and third model updates with the first model of the classifier to recover a third model of the classifier corresponding to the third model of the classifier prior to the failure of at least one of the processors of the plurality of processors of PS.

7. The system according to claim 1, wherein the number of entries of model version and associated ML-worker-IDs in the model download dataset is selected according to a probability that each ML-worker with a corresponding ML-worker-ID stored in the model download dataset that fails during the recovery process is less than a predefined requirement.

8. The system according to claim 7, further comprising:
a controller computing device associated with the model download dataset, wherein the controller is configured to:
delete the oldest entry of model version and associated ML-worker-ID stored in the model download dataset in response to a new entry of model version and associated ML-worker-ID being added and stored in the model download dataset, to maintain a same number of entries;
delete the entries from the global dataset having a value of the model version that represents earlier or equal values of the model version of the oldest entry in the model download dataset that has been deleted;
instruct removal of entries associated with gradient datasets having values of the delta-M-ID that appear in corresponding entries of the global dataset that are deleted.

9. The system according to claim 1, wherein a number of entries storing delta-M-ID and associated model update in each gradient dataset associated with each ML-worker is at most two when the plurality of ML-workers have computational performance characteristics within a tolerance.

10. The system according to claim 1, wherein a number of entries N in the model download dataset is chosen such that a probability that all N ML workers, whose ML-worker-IDs are stored in the model download dataset, fail during the recovery process is below a defined negligible probability value.

11. The system according to claim 1, wherein a plurality of weights of a fully connected layer in each model update is implemented as a multiplication of two vectors.

12. The system according to claim 1, wherein the PS is implemented using a distributed system comprising a plurality of computing devices each including at least one processor.

13. The system according to claim 1, wherein at least two of the ML workers are implemented using distinct computing devices.

14. A method for training a classifier by a plurality of machine learning (ML) workers, the method comprising:
providing, by a parameter server (PS), a model of the classifier to each ML worker of the plurality ML workers;
receiving, by the PS, model updates from each ML worker of the plurality of ML workers;
storing a model-update-identification (delta-M-ID) indicative of the respective model update computed by the respective ML worker;
storing the respective model update associated with each respective delta-M-ID; and
iteratively updating the model of the classifier based on each received model updates;
storing an identification of the ML worker, the ML-worker-ID that computed the model update associated with the delta-M-ID of the respective iteration, and a model version that marks a new model of the classifier in PS that is computed from merging the model update with a previous model of the classifier in PS.

15. The method according to claim 14, wherein a plurality of weights of a fully connected layer in each model update is implemented as a multiplication of two vectors.

16. The method according to claim 14, wherein the PS is implemented using a distributed system comprising a plurality of computing devices each including at least one processor.

17. The method according to claim 14, wherein at least two of the ML workers are implemented using distinct computing devices.

18. A computer-readable storage medium storing a computer program that, when executed by at least one processor of at least one computer, causes training of a classifier by a plurality of machine learning (ML) workers, by performing the steps of:
providing, by a parameter server (PS), a model of the classifier to each ML worker of the plurality ML workers;
receiving, by the PS, model updates from each ML worker of the plurality of ML workers;
storing a model-update-identification (delta-M-ID) indicative of the respective model update computed by the respective ML worker;
storing the respective model update associated with each respective delta-M-ID; and
iteratively updating the model of the classifier based on each received model updates;
storing an identification of the ML worker, the ML-worker-ID that computed the model update associated with the delta-M-ID of the respective iteration, and a model version that marks a new model of the classifier in PS that is computed from merging the model update with a previous model of the classifier in PS.

19. The computer-readable storage medium according to claim 18, wherein the PS is implemented using a distributed system comprising a plurality of computing devices each including at least one processor.

20. The computer-readable storage medium according to claim 18, wherein at least two of the ML workers are implemented using distinct computing devices.

* * * * *